United States Patent
El-Moussa et al.

(10) Patent No.: US 11,159,549 B2
(45) Date of Patent: *Oct. 26, 2021

(54) NETWORK TRAFFIC THREAT IDENTIFICATION

(71) Applicant: British Telecommunications Public Limited Company, London (GB)

(72) Inventors: Fadi El-Moussa, London (GB); Ian Herwono, London (GB)

(73) Assignee: British Telecommunications Public Limited Company, London (GB)

( * ) Notice: Subject to any disclaimer, the term of this patent is extended or adjusted under 35 U.S.C. 154(b) by 385 days.

This patent is subject to a terminal disclaimer.

(21) Appl. No.: 16/086,230

(22) PCT Filed: Mar. 3, 2017

(86) PCT No.: PCT/EP2017/055082
§ 371 (c)(1),
(2) Date: Sep. 18, 2018

(87) PCT Pub. No.: WO2017/167545
PCT Pub. Date: Oct. 5, 2017

(65) Prior Publication Data
US 2020/0296121 A1    Sep. 17, 2020

(30) Foreign Application Priority Data
Mar. 30, 2016 (EP) .................... 16162902

(51) Int. Cl.
*H04L 29/06* (2006.01)
(52) U.S. Cl.
CPC ...... *H04L 63/1425* (2013.01); *H04L 63/1416* (2013.01)
(58) Field of Classification Search
CPC .. H04L 63/1425; H04L 63/1416; G06F 21/55
(Continued)

(56) References Cited

U.S. PATENT DOCUMENTS 6,192,405 B1    2/2001    Bunnell
7,424,744 B1    9/2008    Wu et al.
(Continued)

FOREIGN PATENT DOCUMENTS

CN    107633263 A    1/2018
EP    2381363 A2    10/2011
(Continued)

OTHER PUBLICATIONS

"A Next-Generation Smart Contract and Decentralized Application Platform" Ethereum White Paper, 2016, retrieved from https://github.com/ethereum/wiki/wiki/White-Paper.
(Continued)

*Primary Examiner* — Taghi T Arani
*Assistant Examiner* — Badri Narayanan Champakesan
(74) *Attorney, Agent, or Firm* — Patterson Thuente Pedersen, P.A.

(57) ABSTRACT

A computer implemented method to identify a computer security threat based on communication via a computer network including receiving a definition of acceptable network communication characteristics for each of a plurality of communication protocols; receiving a set of security events for the communication, each security event including network communication characteristics for the communication; for each security event in the set of security events: a) identifying a communication protocol associated with the event; b) detecting deviations of network communication characteristics of the event from the acceptable network communication characteristics for the identified communication protocol; and c) generating a record of each deviation identifying a communication characteristic for which the deviation is detected, and identifying a computer security threat for the communication based on the records generated for the set of security events.

13 Claims, 4 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,716,739 B1* | 5/2010 | McCorkendale | H04L 63/1425 726/23 |
| 7,797,748 B2 | 9/2010 | Zheng et al. | |
| 7,870,153 B2 | 1/2011 | Croft et al. | |
| 7,957,372 B2* | 6/2011 | Boulanger | H04L 63/1416 370/389 |
| 8,271,974 B2 | 9/2012 | Mazhar et al. | |
| 8,375,437 B2 | 2/2013 | Linsley et al. | |
| 8,418,249 B1 | 4/2013 | Nucci et al. | |
| 8,479,294 B1 | 7/2013 | Li et al. | |
| 8,516,241 B2 | 8/2013 | Chang et al. | |
| 8,713,631 B1 | 4/2014 | Pavlyushchik | |
| 8,739,155 B2 | 5/2014 | Hehir et al. | |
| 8,806,638 B1 | 8/2014 | Mani | |
| 8,813,234 B1 | 8/2014 | Bowers et al. | |
| 8,898,788 B1* | 11/2014 | Aziz | G06F 21/554 726/24 |
| 8,910,238 B2 | 12/2014 | Lukacs et al. | |
| 9,009,825 B1* | 4/2015 | Chang | H04L 63/1425 726/22 |
| 9,183,378 B2 | 11/2015 | Banerjee et al. | |
| 9,235,813 B1 | 1/2016 | Qian et al. | |
| 9,306,964 B2* | 4/2016 | Singhal | H04L 63/0218 |
| 9,336,385 B1* | 5/2016 | Spencer | G06F 21/56 |
| 9,466,051 B1 | 10/2016 | Roth et al. | |
| 9,495,668 B1 | 11/2016 | Juels | |
| 9,535,727 B1 | 1/2017 | Jerbi et al. | |
| 9,671,816 B2 | 6/2017 | Berry | |
| 9,798,876 B1 | 10/2017 | Parker-Wood et al. | |
| 9,807,106 B2 | 10/2017 | Daniel et al. | |
| 2002/0100035 A1 | 7/2002 | Kenyon et al. | |
| 2002/0120725 A1 | 8/2002 | DaCosta et al. | |
| 2002/0124187 A1* | 9/2002 | Lyle | H04L 63/1458 726/22 |
| 2003/0084319 A1* | 5/2003 | Tarquini | H04L 63/1416 726/23 |
| 2003/0084349 A1* | 5/2003 | Friedrichs | H04L 63/1408 726/22 |
| 2003/0204644 A1 | 10/2003 | Vincent | |
| 2004/0015977 A1 | 1/2004 | Benke et al. | |
| 2004/0158741 A1 | 8/2004 | Schneider | |
| 2004/0230834 A1* | 11/2004 | McCallam | H04L 67/306 726/23 |
| 2004/0268296 A1 | 12/2004 | Kayam et al. | |
| 2005/0018618 A1* | 1/2005 | Mualem | H04L 63/1458 370/252 |
| 2005/0091269 A1 | 4/2005 | Gerber et al. | |
| 2005/0108562 A1 | 5/2005 | Khazan et al. | |
| 2006/0282660 A1 | 12/2006 | Varghese et al. | |
| 2007/0016953 A1 | 1/2007 | Morris et al. | |
| 2007/0089111 A1 | 4/2007 | Robinson et al. | |
| 2007/0214503 A1 | 9/2007 | Shulman et al. | |
| 2007/0240222 A1 | 10/2007 | Tuvell et al. | |
| 2008/0052780 A1* | 2/2008 | Cao | G06F 21/554 726/23 |
| 2008/0320594 A1 | 12/2008 | Jiang | |
| 2009/0038008 A1 | 2/2009 | Pike | |
| 2009/0044024 A1 | 2/2009 | Oberheide et al. | |
| 2009/0055693 A1 | 2/2009 | Budko et al. | |
| 2009/0254499 A1 | 10/2009 | Deyo | |
| 2010/0011029 A1* | 1/2010 | Niemela | H04L 63/145 707/E17.044 |
| 2010/0027432 A1 | 2/2010 | Gopalan et al. | |
| 2010/0114973 A1 | 5/2010 | Goyal | |
| 2010/0175108 A1 | 7/2010 | Protas | |
| 2010/0262873 A1* | 10/2010 | Chang | H04L 29/12783 714/57 |
| 2011/0004935 A1 | 1/2011 | Moffie et al. | |
| 2011/0023118 A1* | 1/2011 | Wright | G06F 11/28 726/23 |
| 2011/0107330 A1 | 5/2011 | Freundlich et al. | |
| 2011/0167491 A1* | 7/2011 | Ruggerio | G06F 21/552 726/23 |
| 2011/0197070 A1 | 8/2011 | Mizrah | |
| 2011/0213869 A1 | 9/2011 | Korsunsky et al. | |
| 2011/0265154 A1 | 10/2011 | Furlan et al. | |
| 2011/0271279 A1 | 11/2011 | Pate | |
| 2012/0053925 A1 | 3/2012 | Geffin et al. | |
| 2012/0215727 A1 | 8/2012 | Malik et al. | |
| 2012/0246290 A1 | 9/2012 | Kagan | |
| 2012/0284794 A1 | 11/2012 | Trent et al. | |
| 2012/0304007 A1 | 11/2012 | Hanks et al. | |
| 2012/0311526 A1 | 12/2012 | Deanna et al. | |
| 2013/0006949 A1 | 1/2013 | Essawi et al. | |
| 2013/0019277 A1 | 1/2013 | Chang et al. | |
| 2014/0025770 A1* | 1/2014 | Warfield | G06F 16/134 709/213 |
| 2014/0067734 A1 | 3/2014 | Hawkins et al. | |
| 2014/0149983 A1 | 5/2014 | Bonilla et al. | |
| 2014/0164251 A1 | 6/2014 | Loh et al. | |
| 2014/0173740 A1 | 6/2014 | Albanese et al. | |
| 2014/0180738 A1 | 6/2014 | Phillipps et al. | |
| 2014/0215490 A1 | 7/2014 | Mathur et al. | |
| 2014/0298011 A1 | 10/2014 | Ganesan | |
| 2014/0344015 A1 | 11/2014 | Puertolas-Montanes et al. | |
| 2014/0358825 A1 | 12/2014 | Phillipps et al. | |
| 2014/0372346 A1 | 12/2014 | Phillipps et al. | |
| 2015/0101055 A1 | 4/2015 | Tang et al. | |
| 2015/0120567 A1 | 4/2015 | Van Rooyen et al. | |
| 2015/0128263 A1 | 5/2015 | Raugas et al. | |
| 2015/0128274 A1* | 5/2015 | Giokas | H04L 63/1425 726/23 |
| 2015/0134606 A1 | 5/2015 | Magdon-Ismail et al. | |
| 2015/0227741 A1 | 8/2015 | Permeh et al. | |
| 2015/0271318 A1 | 9/2015 | Antos et al. | |
| 2015/0304346 A1 | 10/2015 | Kim | |
| 2015/0332283 A1 | 11/2015 | Witchey | |
| 2015/0332395 A1 | 11/2015 | Walker et al. | |
| 2015/0356523 A1 | 12/2015 | Madden | |
| 2015/0356555 A1 | 12/2015 | Pennanen | |
| 2015/0363876 A1 | 12/2015 | Ronca et al. | |
| 2015/0379423 A1 | 12/2015 | Dirac et al. | |
| 2015/0381651 A1* | 12/2015 | Lietz | G06F 21/57 726/23 |
| 2016/0021122 A1 | 1/2016 | Pevny | |
| 2016/0048771 A1 | 2/2016 | Chen et al. | |
| 2016/0057041 A1 | 2/2016 | Gupta et al. | |
| 2016/0078367 A1 | 3/2016 | Adjaoute | |
| 2016/0086175 A1 | 3/2016 | Finlow-Bates et al. | |
| 2016/0098730 A1 | 4/2016 | Feeney | |
| 2016/0164884 A1 | 6/2016 | Sriram et al. | |
| 2016/0205122 A1 | 7/2016 | Bassett | |
| 2016/0210556 A1 | 7/2016 | Ben Simhon et al. | |
| 2016/0221186 A1 | 8/2016 | Perrone | |
| 2016/0260095 A1 | 9/2016 | Ford | |
| 2016/0283920 A1 | 9/2016 | Fisher et al. | |
| 2016/0350173 A1 | 12/2016 | Ahad | |
| 2016/0366155 A1 | 12/2016 | El-Moussa et al. | |
| 2016/0381070 A1* | 12/2016 | Zhang | H04L 63/1408 726/23 |
| 2017/0013000 A1 | 1/2017 | El-Moussa et al. | |
| 2017/0063886 A1 | 3/2017 | Muddu et al. | |
| 2017/0109735 A1 | 4/2017 | Sheng et al. | |
| 2017/0118815 A1* | 4/2017 | El Khoury | H04L 67/12 |
| 2017/0124534 A1 | 5/2017 | Savolainen | |
| 2017/0142133 A1 | 5/2017 | Kallos | |
| 2017/0223032 A1 | 8/2017 | El-Moussa et al. | |
| 2017/0279774 A1 | 9/2017 | Booz et al. | |
| 2017/0279818 A1 | 9/2017 | Milazzo et al. | |
| 2017/0286136 A1 | 10/2017 | Theo et al. | |
| 2017/0289187 A1 | 10/2017 | Noel et al. | |
| 2017/0323113 A1 | 11/2017 | El-Moussa et al. | |
| 2017/0351860 A1 | 11/2017 | El-Moussa et al. | |
| 2017/0351861 A1 | 12/2017 | El-Moussa et al. | |
| 2018/0025166 A1 | 1/2018 | Daniel et al. | |
| 2018/0026999 A1* | 1/2018 | Ruvio | H04L 41/0631 726/23 |
| 2018/0053002 A1 | 2/2018 | El-Moussa et al. | |
| 2018/0054451 A1 | 2/2018 | El-Moussa et al. | |

(56) References Cited

U.S. PATENT DOCUMENTS

| | | | |
|---|---|---|---|
| 2018/0060575 | A1 | 3/2018 | El-Moussa et al. |
| 2018/0060581 | A1 | 3/2018 | El-Moussa et al. |
| 2018/0060582 | A1 | 3/2018 | El-Moussa et al. |
| 2018/0091531 | A1 | 3/2018 | El-Moussa et al. |
| 2018/0115566 | A1 | 4/2018 | Azvine et al. |
| 2018/0115567 | A1 | 4/2018 | El-Moussa et al. |
| 2018/0144114 | A1 | 5/2018 | Fiske |
| 2018/0152468 | A1 | 5/2018 | Nor et al. |
| 2018/0191751 | A1 | 7/2018 | El-Moussa et al. |
| 2018/0232526 | A1 | 8/2018 | Reid et al. |
| 2018/0260562 | A1 | 9/2018 | Chen et al. |
| 2018/0285585 | A1 | 10/2018 | Daniel et al. |
| 2018/0367548 | A1 | 12/2018 | Stokes, III et al. |
| 2018/0375882 | A1 | 12/2018 | George et al. |
| 2019/0036895 | A1 | 1/2019 | Irvine |
| 2019/0050541 | A1 | 2/2019 | Wright et al. |
| 2019/0139136 | A1 | 5/2019 | Molinari et al. |
| 2020/0302052 | A1* | 9/2020 | El-Moussa .......... H04L 63/1425 |

FOREIGN PATENT DOCUMENTS

| | | |
|---|---|---|
| EP | 2101599 B1 | 9/2013 |
| EP | 2741227 A1 | 6/2014 |
| EP | 2750070 A2 | 7/2014 |
| EP | 2816469 A1 | 12/2014 |
| EP | 3101599 A2 | 12/2016 |
| EP | 3437290 A1 | 2/2019 |
| GB | 2540976 A | 2/2017 |
| GB | 2540977 A | 2/2017 |
| WO | WO-0184285 A2 | 11/2001 |
| WO | WO-2008091785 A2 | 7/2008 |
| WO | WO-2009097610 A1 | 8/2009 |
| WO | WO-2012087685 A1 | 6/2012 |
| WO | WO-2012117253 A1 | 9/2012 |
| WO | WO-2013172750 A1 | 11/2013 |
| WO | WO-2014088912 A1 | 6/2014 |
| WO | WO-2015128612 A1 | 9/2015 |
| WO | WO-2015128613 A1 | 9/2015 |
| WO | WO-2015179020 A2 | 11/2015 |
| WO | WO-2016034496 A1 | 3/2016 |
| WO | WO-2016077127 A1 | 5/2016 |
| WO | WO-2016191639 A1 | 12/2016 |
| WO | WO-2017019391 A1 | 2/2017 |
| WO | WO-2017021153 A1 | 2/2017 |
| WO | WO-2017021154 A1 | 2/2017 |
| WO | WO-2017021155 A1 | 2/2017 |
| WO | WO-2017054985 A1 | 4/2017 |
| WO | WO-2017108576 A1 | 6/2017 |
| WO | WO-2017109128 A1 | 6/2017 |
| WO | WO-2017109129 A1 | 6/2017 |
| WO | WO-2017109135 A1 | 6/2017 |
| WO | WO-2017167544 A1 | 10/2017 |
| WO | WO-2017167545 A1 | 10/2017 |
| WO | WO-2017167547 A1 | 10/2017 |
| WO | WO-2017167548 A1 | 10/2017 |
| WO | WO-2017167549 A1 | 10/2017 |
| WO | WO-2017167550 A1 | 10/2017 |
| WO | WO-2018033350 A1 | 2/2018 |
| WO | WO-2018033375 A3 | 3/2018 |

OTHER PUBLICATIONS

Ahmad S., et al., "How Do Neurons Operate on Sparse Distributed Representations? A Mathematical Theory of Sparsity, Neurons and Active Dendrites," available from Cornell University Library (citation arXiv: 1601.00720) and https://arxiv.org/ftp/arxiv/papers/1601/1601.00720.pdf, retrieved on Mar. 28, 2018, 23 pages.

Ahmad S., et al., "Properties of Sparse Distributed Representations and their Application to Hierarchical Temporal Memory," available from Cornell University Library (citation arXiv: 1503.07469) and https://arx.iv.org/ftp/arx.iv/papers/1503/1503.07469.pdf, retrieved on Mar. 28, 2018, Numenta, Redwood City, CA, USA, Mar. 24, 2015, 18 pages.

Ahmad S., et al., "Real-Time Anomaly Detection for Streaming Analytics," available from Cornell University Library (citation arXiv: 1607.02480) and https://arxiv.org/pdf/1607.02480.pdf, retrieved on Mar. 28, 2018, Numenta, Inc., Redwood City, CA, USA, Jul. 8, 2016, 10 pages.

Anonymous: "Who will protect users from ethereum based malware?" Mar. 28, 2016 XP055306678, Retrieved from the Internet: URL: https://www.reddit.com/r/ethereum/comments/4ccfaa/who_will_protect_users_from_ethereum_based_malware/?st=itbp2q49&sh=d8cc4355 on Sep. 29, 2016.

Anonymous, "Can BitCoin be a better DRM? BitcoinBeginners," retrieved from https://www.reddit.com/r/BitcoinBeginners/commentsll y5yh8/can bitcoin be_a_better_drm, Feb. 17, 2014, 3 pages.

Anonymous, "Colored Coins—Bitcoin Wiki," Retrieved from https://en.bitcoin.it/w/index.php?title=ColoredCoins&oldid=57259, Jul. 7, 2015, 6 pages.

Antonopoulos A M., "Mastering Bitcoin-Unlocking Digital Crypto-Currencies," Early Release Raw & Unedited, ISBN: 978-1-449-37404-4; retrieved from: https://unglueitfiles.s3.amazonaws.com/ebf/05db7df4f31840f0a873d6ea14dcc28d.pdf, Dec. 2014, 282 pages.

International Preliminary Report on Patentability for Application No. PCT/EP2017/055094, dated Oct. 11, 2018, 8 pages.

International Search Report and Written Opinion for Application No. PCT/EP2017/055094, dated May 15, 2017, 10 pages.

Tschorsch F., et al., "Bitcoin and Beyond: A Technical Survey on Decentralized Digital Currencies," International Association for Cryptologic Research, May 15, 2015, pp. 1-37.

Wang Z., "The Applications of Deep Learning on Traffic Identification," 2015.

Wikipedia, "Block chain (database)—Wikipedia, the free encyclopedia", Nov. 29, 2015, retrieved from the Internet: URL: https://en.wikipedia.org/w/index.php?title=Block_chain_(database)oldid=692921608.

Application and Filing Receipt for U.S. Appl. No. 15/541,089, filed Jun. 30, 2017, Inventor(s): El-Moussa et al.

Application and Filing Receipt for U.S. Appl. No. 15/541,128, filed Jun. 30, 2016, Inventor(s): El-Moussa et al.

Application and Filing Receipt for U.S. Appl. No. 15/857,163, filed Dec. 28, 2017, Inventor(s): El-Moussa et al.

Application and Filing Receipt for U.S. Appl. No. 15/223,261, filed Jul. 29, 2016, Inventor: Daniel et al, 182 pages.

U.S. Appl. No. 16/086,142, filed Sep. 18, 2018, Inventor(s): El-Moussa et al.

Assia Y., et al., "Colored Coins Whitepaper," 2015, available at docs.google.com/document/d/1AnkPcVZTCMLizw4DvsW6M8Q2JCOIIzrTLuoWu2z1BE, 23 pages.

Benders J.F., "Partitioning Procedures for Solving Mixed Variables Programming Problems," 1962, vol. 4, pp. 238-252.

Billaudelle S., et al., "Porting HTM Models to the Heidelberg Neuromorphic Computing Platform," available from Cornell University Library (citation arXiv: 1505. 02142), retrieved on Mar. 28, 2018, from https://arx.iv.org/pdf/1505.02142.pdf, Kirchhoff-Institute for Physics, May 2015, 9 pages.

Biryukov A., et al., "University of Luxembourg" Jan. 19, 2016, XP055306767, Luxemburg, retrieved from URL:http://wwwfr.uni.lu/snt/news_events/speaker_s_presentations on Sep. 29, 2016, pp. 5 and 29.

Bonneau J., et al., "Research Perspectives and Challenges for Bitcoin and Cryptocurrencies," International Association for Cryptologic Research, Mar. 19, 2015, 18 pages.

Chaisiri, "Optimization of Resource Provisioning Cost in Cloud Computing," IEEE Transactions on Services Computing, Apr.-Jun. 2012, vol. 5 (2), 14 pages.

Cruz J.P., et al., "The Bitcoin Network as Platform for TransOrganizational Attribute Authentication," WEB 2015, The Third International Conference on Building and Exploring Web Based Environments, XP055239598, Rome, Italy, 2015, 7 pages.

Cui, et al., "Continuous Online Sequence Learning with an Unsupervised Neural Network Model," Published in Neural Computation and available from https://www.mitpressjournals.org/doi/pdf/10.1162/NECOa_00893, retrieved on Mar. 28, 2018, Numenta Inc., Redwood City, CA, USA, Nov. 2016, vol. 28 (11), 31 pages.

(56) References Cited

OTHER PUBLICATIONS

Cui, et al., "The HTM Spatial Pooler: A Neocortical Algorithm for Online Sparse Distributed Coding," available from Cold Spring Harbor Laboratory bioRxiv (citation doi.org/10.1101/085035) and https://www.biorxiv.org/content/biorxiv/early/2017/02/16/085035.full.pdf, retrieved on Mar. 28, 2018, Numenta Inc., Redwood City, CA, USA, Feb. 3, 2017, 16 pages.
CVE Details the Ultimate Security Vulnerability Datasouce, "Current CVSS Score Distribution for All Vulnerabilities" retrieved from https://www.cvedetails.com/ on Jun. 28, 2018, 1 pages.
Czepluch J.S., et al., "The Use of Block Chain Technology in Different Application Domains," XP055242451, retrieved from http://http://www.lollike.org/bachelor.pdf, May 20, 2015, 109 pages.
Dr Gavin Wood, "Ethereum: A Secure Decentralize Generalized Transaction Ledger," EIP-150 Revision, Retrieved from http://gavwood.com//paper.pdf, Jun. 4, 2014, 32 pages.
Extended European Search Report for Application No. EP15179440.1, dated Feb. 10, 2016, 6 pages.
First.org, Inc., "Common Vulnerability Scoring System, V3 Development Update," available at www.first.org/cvss, CVSS v3.0 User Guide (v1.5), Jun. 2015; 15 pages.
Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.
Frigault M., "Measuring Network Security Using Bayesian Network-Based Attack Graphs," The Concordia Institute of Information systems Engineering, Mar. 2010, 88 pages.
Grushack J., et al., "Currency 3.0, Examining Digital Crypto Currency Markets," Union College, XP055242356, Retrieved from http://antipasto.union.edu/engineering/Archives/SeniorProjects/2014/CS.2014/files/grushacj/grushacj_paper.pdf, Jun. 2014, 44 pages.
Hawkins, et al., in "On Intelligence, How a New Understanding of the Brain Will Lead to the Creation of Truly Intelligent Machines," Times Books, ISBN 0/8050-7 456-2, 2004, Jul. 14, 2005; 174 pages.
Hawkins, et al., "Why Neurons Have Thousands of Synapses, A Theory of Sequence Memory in Neocortex," Published in Frontiers in Neural Circuits (10 (2016) 1-13, doi:I0.3389/fncir.2016.00023) and available from https://www.frontiersin.org/articlesll0.3389/fncir.2016.00023/full, retrieved on Mar. 28, 2018, Numenta Inc., Redwood City, CA, USA, Mar. 30, 2016, 13 pages.
International Preliminary Report on Patentability for Application No. PCT/EP2017/055081, dated Oct. 11, 2018, 9 pages.
International Preliminary Report on Patentability for Application No. PCT/EP2017/055082, dated Oct. 11, 2018, 8 pages.
International Preliminary Report on Patentability for Application No. PCT/EP2017/055090, dated Oct. 11, 2018, 10 pages.
International Preliminary Report on Patentability for Application No. PCT/EP2017/055091, dated Oct. 11, 2018, 9 pages.
International Search Report and Written Opinion for Application No. PCT/EP2015/080244, dated Mar. 24, 2016, 9 pages.
International Search Report and Written Opinion for Application No. PCT/EP2015/080246, dated Mar. 14, 2016, 10 pages.
International Search Report and Written Opinion for Application No. PCT/EP2016/067309, dated Nov. 3, 2016, 9 pages.
International Search Report and Written Opinion for Application No. PCT/EP2016/067310, dated Sep. 22, 2016, 9 pages.
International Search Report and Written Opinion for Application No. PCT/EP2017/055081, dated Apr. 7, 2017, 11 pages.
International Search Report and Written Opinion for Application No. PCT/EP2017/055082, dated Apr. 26, 2017, 9 pages.
International Search Report and Written Opinion for Application No. PCT/EP2017/055090, dated Jun. 14, 2017, 12 pages.
International Search Report and Written Opinion for Application No. PCT/EP2017/055091, dated Apr. 11, 2017, 11 pages.
International Search Report and Written Opinion for Application No. PCT/EP2017/055095, dated Apr. 11, 2017, 10 pages.
International Preliminary Report on Patentability for Application No. PCT/EP2017/055095, dated Oct. 11, 2018, 8 pages.
Lavin, et al., "Evaluating Real-time Anomaly Detection Algorithms, the Numenta Anomaly Benchmark," available from Cornell University Library (citation archive:1510.03336) https://arxiv.org/ftp/arxiv/papers/1510/1510.03336.pdf, retrieved on Mar. 28, 2018, Numenta, Inc., Redwood City, CA, USA, Oct. 9, 2015, 8 pages.
Adler M., "Threat Intelligence Visibility—the way forward," BT, 2015, available from www.globalservices.bt.com/uk/en/products/assure threat_ monitoring.
Miller A., "The State-of-the-Art of Smart Contracts" Jan. 19, 2016, XP055306766, Luxemburg retrieved from the Internet: URL: http://wwwfr.uni.lu/snt/news_events/speaker_s_presentations on Sep. 29, 2016, pp. 7-8, 16 and 18.
Munoz-Gonzalez, "Exact Inference Techniques for the Dynamic Analysis of Bayesian Attack Graphs," Imperial college, London, Oct. 2015, 14 pages.
Numenta, "Biological and Machine Intelligence (BAMI), A living book that documents Hierarchical Temporal Memory (HTM)," Numenta, Inc., Mar. 8, 2017, retrieved on Mar. 28, 2018 from https://numenta.com/assets/pdf/biological-and-machine-intelligence/BAMIComplete.pdf, 69 pages.
Numenta, "Hierarchical Temporal Memory including HTM Cortical Learning Algorithms," Version 0.2.1, Numenta, Sep. 12, 2011, 68 pages.
Numenta, "Sparse Distributed Representations," Numenta, available from https://numenta.com/assets/pdf/biological-and-machine-intelligence/BaMISDR.pdf and accessed on Mar. 29, 2017, retrieved on Mar. 28, 2018, 15 pages.
Olshausen, et al., "Sparse Coding with an Overcomplete Basis Set, A Strategy Employed by VI?," Olshausen, B.A., Field, D.J., 1997, Vision Research, 37:3311-3325) retrieved on Mar. 28, 2018 from http://www.chaos.gwdg.de/michael/CNS course_2004/papersmax/OlshausenFieldl997.pdf, Dec. 24, 1996, 15 pages.
Plohmann D., et al., "Case study of the Miner Botnet", Cyber Conflict (CYCON), 2012 4TH International Conference on Jun. 5, 2012, pp. 1-16.
International Search Report and Written Opinion for PCT Application No. PCT/EP2016/067308, dated Sep. 21, 2016, 8 pages.
Shah S.Y., et al., "Price Based Routing for Event Driven Prioritized Traffic in Wireless Sensor Networks," Apr. 29-May 1, 2013, IEEE 2nd Network Science Workshop, XP032487185, 8 pages.
Purdy S., "Encoding Data for HTM Systems," Available from Cornell University Library (citation arXiv: 1602.05925), retrieved on Mar. 28, 2018 from https://arx.iv.org/ftp/arx.iv/papers/1602/1602.05925.pdf, Numenta, Inc., Redwood City, California, USA, Feb. 2016, 11 pages.
Rosenfeld M., "Overview of Colored Coins," https:1/bravenewcoin.com/assets/Whitepapers/Overview-of-Colored-Coins.pdf, Dec. 4, 2012, 13 pages.
Skybox Security; Cybersecurity Management & Analytics retrieved from https://www.skyboxsecurity.com/ on Jul. 12, 2018, 7 pages.
Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.
OPNET Technologies Network Simulator I Riverbed, retrieved from https ://www. riverbed. com/products/ steel central/ opnet.html ?redirect=opnet on Jun. 28, 2018, 5 pages.
International Preliminary Report on Patentability for Application No. PCT/EP2015/080244, dated Jul. 13, 2017, 8 pages.
International Preliminary Report on Patentability for Application No. PCT/EP2015/080246, dated Jul. 13, 2017, 8 pages.
International Preliminary Report on Patentability for Application No. PCT/EP2016/067308, dated Feb. 15, 2018, 7 pages.
International Preliminary Report on Patentability for Application No. PCT/EP2016/067309, dated Feb. 15, 2018, 7 pages.
International Preliminary Report on Patentability for Application No. PCT/EP2016/067310, dated Feb. 15, 2018, 8 pages.
Asmi E.A.K., et al., "Bitcoin-Based Decentralized Carbon Emissions Trading Infrastructure Model," Systems Engineering, Mar. 2015, vol. 18 (2), Retrieved from the Internet: URL: https://www.researchgate.net/publication/268686553, 15 pages.
Application and Filing Receipt for U.S. Appl. No. 16/086,142, filed Sep. 18, 2018, Inventor(s): El-Moussa et al.

(56) References Cited

OTHER PUBLICATIONS

Bakshi, et al., "Securing Cloud from DDOS Attacks Using Intrusion Detection System in Virtual Machine," IEEE, 2010, 5 pages.

Bellifemine, et al., "JADE: A Software Framework for Developing Multi-Agent Applications. Lessons Learned," Elsevier, 2007, 12 pages.

Bestuzhev., "Steganography or Encryption in Bankers?," Nov. 10, 2011, retrieved on Feb. 15, 2018 at https://securelist.com/steganography-or-encryption-in-bankers-11/31650/, 3 pages.

Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.

Braden R., "Requirements for Internet Hosts-Communication Layers," Oct. 1989, Internet Protocol Suite RFC1122, Internet Engineering Task Force, https://tools.ietf.org/html/rfc1122 retrieved on Feb. 15, 2018, 116 pages.

Campello R.J.G.B., et al., "Density-Based Clustering Based on Hierarchical Density Estimates," In Prosecution Advances in Knowledge Discovery and Data Mining, Part II, LNAI 7819, 2013, pp. 160-172.

Chen, et al., "Spatial-Temporal Modeling of Malware Propagation in Networks," IEEE Transactions on Neural Networks, vol. 16 (5), Sep. 2005, 13 pages.

Combined Search and Examination Report for Great Britain Application No. 1707377.6, dated Nov. 9, 2017, 9 pages.

Combined search and Examination Report under Sections 17 and 18(3) for Great Britain Application No. 1707376.8, dated Nov. 9, 2017, 8 pages.

Combined search and Examination Report under Sections 17 and 18(3) for Great Britain Application No. 1707378.4, dated Nov. 9, 2017, 11 pages.

DMTF, "Open Virtualization Format Specification," Document No. DSP0243, Version: 1.1.0, Jan. 12, 2010, 42 pages.

Dobrushin R.L., et al., "Entropy," Encyclopedia of Mathematics, retrieved on Feb. 15, 2018 from http://www.encyclopediaofmath.org/index.php?title=Entropy&oldid=15099, Springer, ISBN 1402006098, 2002, 2 pages.

Eddy S R., "What is a Hidden Markov Model?," Nature Biotechnology, vol. 22 (10), Oct. 2004, pp. 1315-1316.

Ester M, et al., "A Density-Based Algorithm for Discovering Clusters in Large Spatial Databases With Noise," Proceedings of Knowledge Discovery and Data Mining, AAAI, 1996, 6 pages.

European Communication for Application No. 17709036.2, dated Jun. 15, 2020, 6 pages.

European Search Report for Application No. EP17164006.3, dated Jun. 29, 2017, 6 pages.

Extended European Search Report for Application No. 16162902.7, dated Jun. 3, 2016, 7 pages.

Extended European Search Report for Application No. 17170020.6, dated Nov. 10, 2017, 8 pages.

Extended European Search Report for Application No. 17170022.2, dated Nov. 16, 2017, 8 pages.

Extended European Search Report for Application No. 17170024.8, dated Nov. 10, 2017, 10 pages.

Extended European Search Report for Application No. 19217369.8, dated May 15, 2020, 10 pages.

Extended European search report for Application No. 16162915.9, dated Oct. 10, 2016, 11 pages.

Fiore U., "Network Anomaly Detection with the Restricted Boltzmann Machine," Neurocomputing, 2013, 11 pages.

Fischer A., et al., "Training Restricted Boltzmann Machines: An Introduction," Department of Computer Science, University of Copenhagen, vol. 47 (1), 2014, pp. 1-27.

Goubault-Larrecq J., et al., "Detecting Subverted Cryptographic Protocols by Entropy Checking," Research Report LSV-06-13, Retrieved from http://www.lsv.fr/Publis/RAPPORTS_LSV/PDF/rr-lsv-2006-13.pdf on Feb. 15, 2018, Jun. 2006, 21 pages.

H.225.0, "Call Signaling Protocols and Media Stream Packetization for Packetbased Multimedia Communication Systems," International Telecommunication Union, Dec. 2009 and Amendment 1 dated Mar. 2013, 6 pages.

Heimann M., et al., "On Generalizing Neural Node Embedding Methods to Multi-Network Problems," MLG' 17, Aug. 2017, 4 pages.

Hinton G.E., et al., "Reducing the Dimensionality of Data with Neural Networks," Science, vol. 313, Jul. 28, 2006, pp. 504-507.

International Preliminary Report for Application No. PCT/EP2018/061261, dated Nov. 21, 2019, 8 pages.

International Preliminary Report on Patentability for Application No. PCT/EP2015/069670, dated Mar. 16, 2017, 7 pages.

International Preliminary Report on Patentability for Application No. PCT/EP2015/069673, dated Mar. 16, 2017, 9 pages.

International Preliminary Report on Patentability for Application No. PCT/EP2016/052865, dated Aug. 24, 2017, 9 pages.

International Search Report and Written Opinion for Application No. PCT/EP2018/061405, dated Jun. 20, 2018, 12 pages.

International Search Report and Written Opinion for Application No. PCT/EP2018/061406, dated Jun. 20, 2018, 13 pages.

International Search Report and Written Opinion for International Application No. PCT/EP2016/081187 dated Feb. 21, 2017, 8 pages.

International Search Report and Written Opinion for PCT Application No. PCT/EP2016/082476, dated Feb. 9, 2017, 8 pages.

International Search Report and Written Opinion for PCT Application No. PCT/EP2016/082477, dated Feb. 22, 2017, 8 pages.

International Preliminary Report on Patentability for Application No. PCT/EP2018/057674, dated Oct. 10, 2019, 8 pages.

International Preliminary Report on Patentability for Application No. PCT/EP2018/057685, dated Oct. 10, 2019, 9 pages.

International Preliminary Report on Patentability for Application No. PCT/EP2018/057686, dated Oct. 10, 2019, 8 pages.

International Preliminary Report on Patentability for Application No. PCT/EP2018/061405, dated Nov. 21, 2019, 7 pages.

International Preliminary Report on Patentability for Application No. PCT/EP2018/061406, dated Nov. 21, 2019, 8 pages.

International Preliminary Report on Patentability for Application No. PCT/EP2018/061407, dated Nov. 21, 2019, 8 pages.

International Preliminary Report on Patentability for Application No. PCT/EP2018/061408, dated Nov. 21, 2019, 10 pages.

International Preliminary Report on Patentability for Application No. PCT/EP2018/065212, dated Dec. 19, 2019, 10 pages.

International Preliminary Report on Patentability for Application No. PCT/EP2018/065211, dated Dec. 19, 2019, 8 pages.

International Search Report and Written Opinion for Application No. PCT/EP2015/069670, dated Nov. 11, 2015, 8 pages.

International Search Report and Written Opinion for Application No. PCT/EP2015/069673, dated Nov. 12, 2015, 10 pages.

International Search Report and Written Opinion for Application No. PCT/EP2016/052865, dated Mar. 17, 2016, 11 pages.

International Search Report and Written Opinion for Application No. PCT/EP2017/068738, dated Oct. 9, 2017, 13 pages.

International Search Report and Written Opinion for Application No. PCT/EP2017/069272, dated Feb. 20, 2018, 13 pages.

International Search Report and Written Opinion for Application No. PCT/EP2018/057674, dated May 2, 2018, 10 pages.

International Search Report and Written Opinion for Application No. PCT/EP2018/057685, dated Jun. 1, 2018, 11 pages.

International Search Report and Written Opinion for Application No. PCT/EP2018/057686, dated Apr. 20, 2018, 10 pages.

International Search Report and Written Opinion for Application No. PCT/EP2018/061261, dated Jun. 20, 2018, 13 pages.

International Search Report and Written Opinion for Application No. PCT/EP2018/061407, dated Jun. 20, 2018, 13 pages.

International Search Report and Written Opinion for Application No. PCT/EP2018/061408, dated Jun. 20, 2018, 15 pages.

International Search Report and Written Opinion for Application No. PCT/EP2018/065211, dated Jul. 31, 2018, 10 pages.

International Search Report and Written Opinion for Application No. PCT/EP2018/065212, dated Aug. 3, 2018, 12 pages.

(56) References Cited

OTHER PUBLICATIONS

International Telecommunication Union—ITU-T, "Telecommunication Standardization Sector of ITU, Series H.235.0 to H.235.7," Sep. 2005 and Jan. 2014, 296 pages.
International Telecommunication Union H.245 Series H, "Control protocol for multimedia communication," Audiovisual and Multimedia Systems Infrastructure of audiovisual services—Communication procedures, May 2011, 348 pages.
ITU-T H.323 Series H, "Audiovisual and Multimedia Systems Infrastructure of audiovisual services Systems and terminal equipment for audiovisual services," Packed-based multimedia communications systems, Amendment 1: Use of Facility message to enable call transfer, Mar. 2013, 6 pages.
Janakiraman V.M., et al., "Anomaly Detection in Aviation Data Using Extreme Learning Machines," 2016 International Joint Conference on Neural Networks (IJCNN), IEEE, Jul. 24, 2016, pp. 1993-2000.
Jin, et al., "A Guest-Transparent File Integrity Monitoring Method in Virtualization Environment," Elsevier, 2010, 11 pages.
Jinwon A., et al., "Variational Autoencoder based Anomaly Detection using Reconstruction Probability," SNU Data Mining Center, 2015-2 Special Lecture on IE, Dec. 27, 2015, 18 pages.
Kolbitsch C., et al., "Effective and Efficient Malware Detection at the End Host," Jan. 2009, 48 pages.
Li G., et al., "Fractal-based Algorithm for Anomaly Pattern Discovery on Time Series Stream," Journal of Convergence Information Technology, vol. 6 (3), Mar. 31, 2011, pp. 181-187.
Limthong K., et al., "Network Traffic Anomaly Detection using Machine Learning Approaches," 2012, 4 pages.
Marnerides A K., et al., "Malware Detection in the Cloud under Ensemble Empirical Mode Decomposition," 2015, 7 pages.
Mikolov T., et al., "Efficient Estimation of Word Representations in Vector Space," Sep. 7, 2013, pp. 1-12.
Mikolov T., et al., "Efficient Estimation of Word Representations in Vector Space," ArXiv, CoRR (Computing Research Repository), 2013, 12 pages.
Muromagi A., et al., "Linear Ensembles of Word Embedding Models," Apr. 5, 2017, 9 pages.
Page., et al., "The PageRank Citation Ranking: Bringing Order to the Web," Jan. 29, 1998, pp. 1-17.
Patel H, "A block chain based decentralized exchange," International Association for Cryptologic Research, XP061017563, Dec. 18, 2014, vol. 20141225:065012, 9 pages.
Ring M., et al., "IP2Vec: Learning Similarities Between IP Addresses," IEEE International Conference on Data Mining Workshops, 2017, 10 pages.
Rumelhart D.E., et al., "Learning Internal Representations by Error Propagation," Institute for Cognitive Science Report 8506, Sep. 1985, 49 pages.
Search Report dated Nov. 8, 2017 for Great Britain Application No. GB1707381.8, 7 pages.
Service Name and Transport Protocol Port No. Registry Feb. 15, 2018, available from www.iana.org/assignments/service-names-nort-numbers/servicenames-port-numbers.txt, retrieved on Mar. 6, 2018, 411 pages.
Shannon, "A Mathematical Theory of Communication," The Bell System Technical Journal, Jul., Oct. 1948, vol. 27, pp. 379-423, 623-656, 55 pages.
Traina C., et al., "Fast Feature Selection Using Fractal Dimension," XV Simposio Brasileiro de Banco de Dados, Joao Pessoa, Paraiba, Brasil, Anais, Oct. 2000, 16 pages.
Wu J., et al., "Hierarchical Temporal Memory Method for Time-Series-Based Anomaly Detection," 2016, IEEE, 16th International Conference Data Mining Workshops, XP033055893, Dec. 2016, pp. 1167-1172.
Zambonelli, et al., "Agent-Oriented Software Engineering for Internet Applications," Coordination of Internet Agents: Models, Technologies, and Applications, Chapter-13, Springer, 2000, 21 pages.
Zhang H., et al., "Detecting Encrypted Botnet Traffic," Computer Communications Workshops, Proceedings IEEE INFOCOM, 2013, 6 pages.
Zupan B., et al., "Machine Learning by Function Decomposition," ICML 1997, Retrieved from http://citeseerx.ist.psu.edu/viewdoc/download?doi=10.1.1.29.4455&rep=rep1&type=pdfon Oct. 17, 2017, 9 pages.
Araya D.B., et al., "Collective Contextual Anomaly Detection Framework for Smart Buildings," 2016 International Joint Conference on Neural Networks (IJCNN), IEEE, Jul. 24, 2016, pp. 511-518.
Combined Search and Examination Report for Great Britain Application No. 1707379.2, dated Nov. 9, 2017, 9 pages.

* cited by examiner

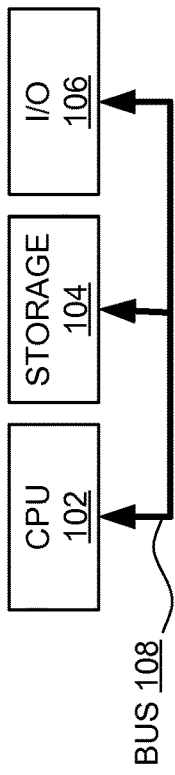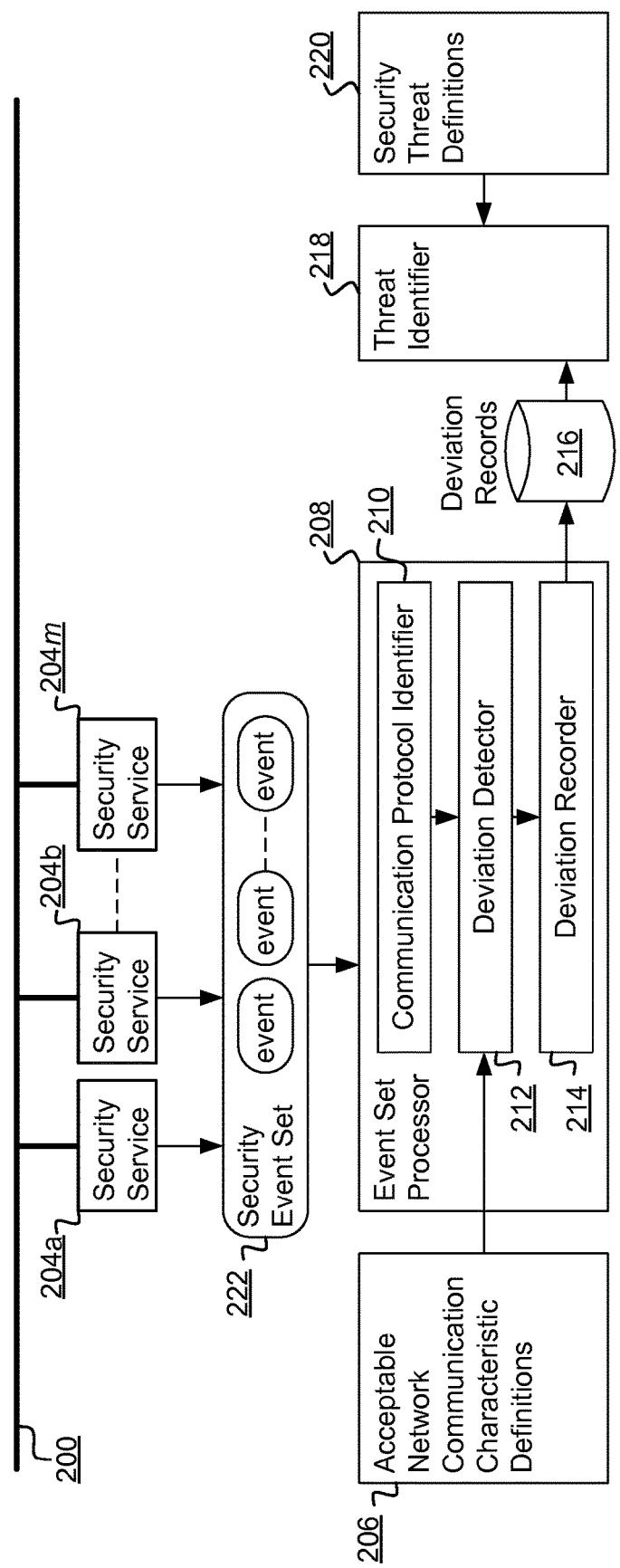

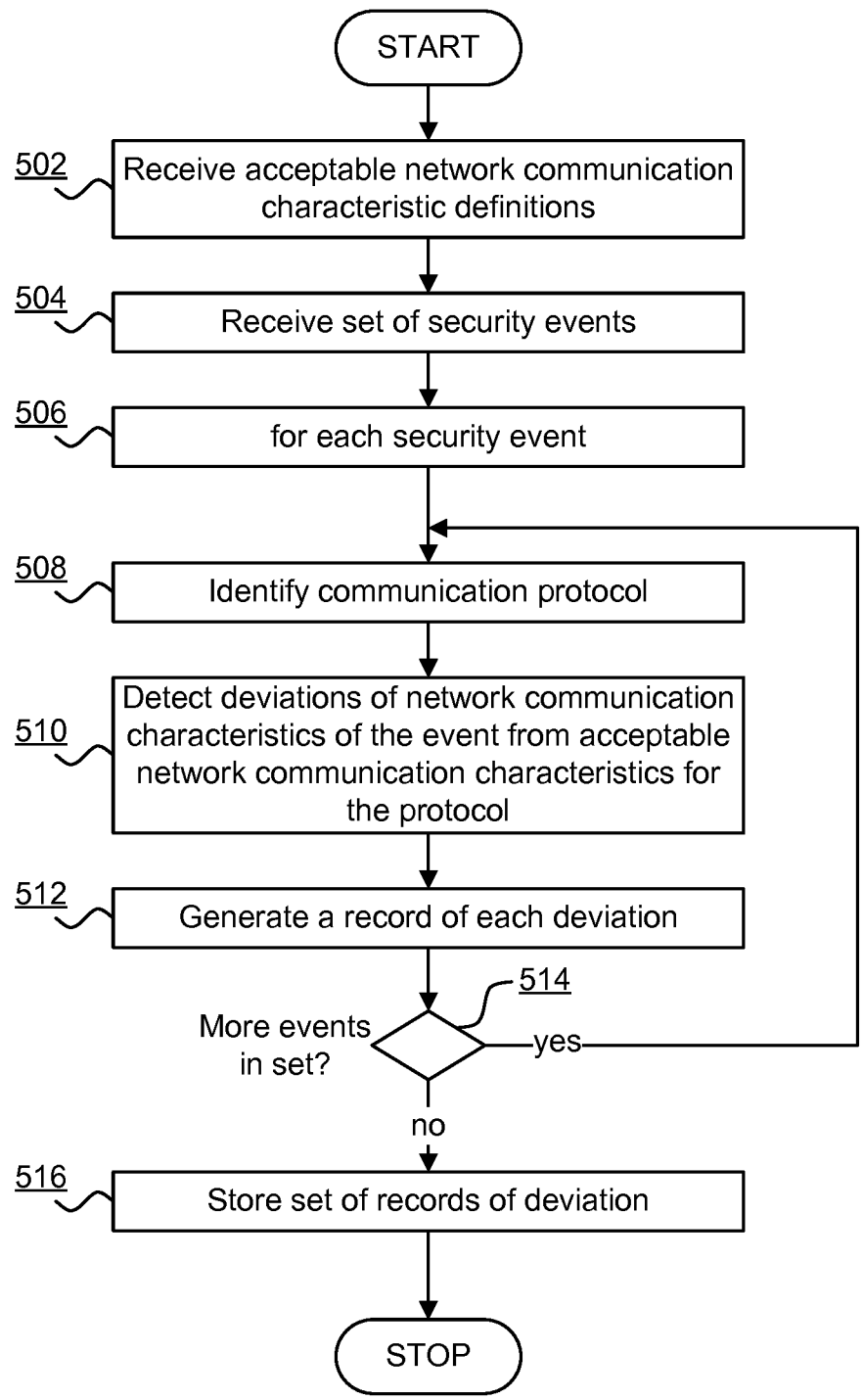

NETWORK TRAFFIC THREAT IDENTIFICATION

CROSS-REFERENCE TO RELATED APPLICATION

The present application is a National Phase entry of PCT Application No. PCT/EP2017/055082, filed Mar. 3, 2017, which claims priority from EP Patent Application No. 16162902.7, filed Mar. 30, 2016 each of which is hereby fully incorporated herein by reference.

TECHNICAL FIELD

The present disclosure relates to the identification of network traffic threats.

BACKGROUND

Computer networks can be employed by many technologies that threaten the security, reliability, accessibility and/or availability of computing resources. Such threats can include attacks exploiting vulnerabilities in computer systems, software or networks or attacks seeking to consume or overwhelm the resources of a computing system. Threats also occur where no direct attack is involved, such as the communication or propagation of malicious software (malware) or communication between executing malware in any number of computer systems.

Software, hardware and services deployed to identify and respond to such threats can include intrusion detection systems, virus detection systems, firewalls, anti-malware, anti-spyware and the like. Often multiple such services are deployed together to improve security and a challenge arises of coordinating between the services. For example, each deployed service can generate events corresponding to occurrences detected in a network. Such events can be disparate in any number of characteristics including, inter alia: form; format; style; content; nomenclature; frequency; sensitivity; etc. Such differences can arise due to different technologies employed by services, different threats or exploits analyzed by services, or even different vendors providing such services.

To partially address these challenges security experts can adopt rules-based threat monitoring technology in which rules are defined for application to events generated by security services to identify general classes of threat for further analysis. One such threat monitoring technology is BT Assure Threat Monitoring as described in "Threat Intelligence Visibility—the way forward" (Mike Adler, BT, 2015, available from www.globalservices.bt.com/uk/en/products/assure_threat_monitoring). BT Assure Threat Monitoring identifies events of interest using defined rules and draws together resulting sets of events into "problem tickets" for further processing or analysis.

While effective in identifying threats or potential threats, the disparities between events processed by rules can lead to the identification of multiple potential threats that actually relate to a single threat. Further, the rules-based approach requires frequent revision and addition to a repository of rules to avoid new or previously unidentified threats to be detected and relationships between them to be identified.

SUMMARY

Thus there is a need to address the aforementioned challenges.

The present disclosure accordingly provides, in a first aspect, a computer implemented method to identify a computer security threat based on communication via a computer network, the method comprising: receiving a definition of acceptable network communication characteristics for each of a plurality of communication protocols; receiving a set of security events for the communication, each security event including network communication characteristics for the communication; for each security event in the set of security events: a) identifying a communication protocol associated with the event; b) detecting deviations of network communication characteristics of the event from the acceptable network communication characteristics for the identified communication protocol; and c) generating a record of each deviation identifying a communication characteristic for which the deviation is detected, and identifying a computer security threat for the communication based on the records generated for the set of security events.

In some embodiments the method further comprises: receiving a definition of one or more computer security threats, each computer security threat being defined, for each of one or more communication protocols, by a set of deviations from the acceptable network communication characteristic for the protocol, and wherein identifying a computer security threat for the communication includes comparing the records generated for the set of security events to the received definition of one or more computer security threats.

In some embodiments the definition of acceptable network communication characteristics for a communication protocol is based on a specification of the protocol.

In some embodiments one or more computer security threats is further defined by an extent or range of extents of deviation from acceptable network communication characteristics for a communication protocol.

In some embodiments one or more of the records of each deviation further identifies an extent of deviation between network communication characteristics of the security event from acceptable network communication characteristics for the identified communication protocol.

In some embodiments network communication characteristics include one or more of: a size, range of sizes, volume, range of volumes, rate and/or range or rates of data in the communication; a size or range of sizes of a header of a message in the communication; characteristics of a source entity to the communication; characteristics of a destination entity to the communication; and/or features of a communication protocol.

In some embodiments features of a communication protocol include one or more of: an order of messages or types of message according to one or more protocol definitions; and a message structure or format.

In some embodiments characteristics of the source entity include one or more of: a particular port of the source entity; a set of ports of the source entity; and a number of ports of the source entity.

In some embodiments characteristics of the destination entity include one or more of: a particular port of the destination entity; a set of ports of the destination entity; and a number of ports of the destination entity.

In some embodiments the security events are received from one or more computer security services.

The present disclosure accordingly provides, in a second aspect, a computer system including a processor and memory storing computer program code for performing the method described above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIG. 1 is a block diagram of a computer system suitable for the operation of embodiments of the present disclosure.

FIG. 2 is a component diagram of a system to identify a computer security threat based on communication via a computer network in accordance with an embodiment of the present disclosure.

FIG. 5 is a flowchart of a method to identify a computer security threat in accordance with an alternative embodiment of the present disclosure.

DETAILED DESCRIPTION

Figure 3:
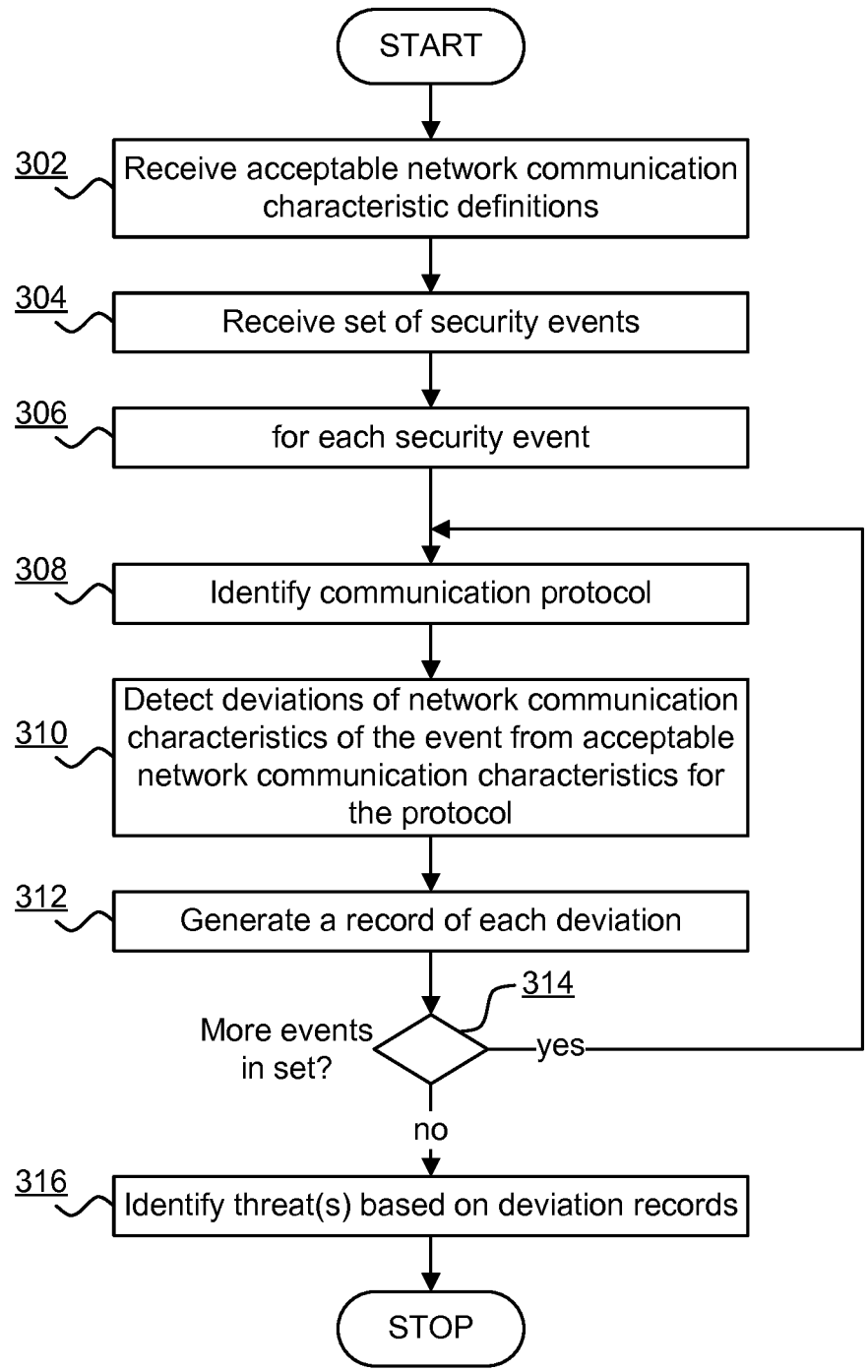
FIG. 3 is a flowchart of a method to identify a computer security threat in accordance with an embodiment of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

FIG. 2 is a component diagram of a system to identify a computer security threat based on communication via a computer network in accordance with an embodiment of the present disclosure. A computer network communication 200 is one or more network communications occurring on a computer network at a point or over a period in time. Such networks can include wired or wireless networks, physical or virtual networks, internal or public networks and the like. The communication 200 includes network messages, packets, datagrams, data transfer units, or the like communicated between a source entity and a destination entity. Such entities can be computer systems, hardware, software or firmware devices howsoever implemented and exemplars of their nature and implementation will be apparent to those skilled in the art and are beyond the scope of this description. The communication 200 employs one or more communication protocols which can be low level protocols such as link layer protocols (e.g. Ethernet), network layer protocols such as internet protocol (IP), transport level protocols such as transmission control protocol (TCP) and user datagram protocol (UDP), application layer protocols such as: domain name system protocols (DNS); media protocols such as video, audio, telephony, etc.; hypertext transfer protocol (HTTP); and specific protocols employed by applications software such as database applications, middleware software, Java software, message brokers and the like. It will be appreciated that many other communication protocols may be employed that are not mentioned here to which embodiments of the present disclosure can be applied.

For proper implementation by all interacting computing entities, a communication protocols is fully specified in a protocol specification. Such specifications can be public (such as the "request for comments" (RFC) specifications for internet protocols) or private and serve to define the characteristics of a network communication employing a protocol. For example, a protocol specification can define network communication characteristics such as: a size, range of sizes, volume, range of volumes, rate and/or range of rates of data in a communication using the protocol; a size or range of sizes of a header of a message in the communication; characteristics of a source and/or destination entities in the communication such as addressing methodologies, port usage and the like; and/or features of the communication protocol. Such features can include: a nature of connection setup for a protocol defining, for example, a protocol of message exchanges between communicating entities serving to define the commencement of a new communication, or continuation of an existing communication; a nature of ongoing communication techniques including error detection and recovery, data integrity checking, data communication retries, communication synchronization methodologies, message numbering conventions (if any), expected order of messages, expected message lengths, volume of messages and the like; message structure and/or format such as a header and payload organization and the constituents of each along with any checksum, resend or error detection mechanisms; communication close-down processes including a protocol for ceasing, terminating or closing a communication; and other such characteristics and features as will be apparent to those skilled in the art.

Communication 200 via a computer network can include communication attributable to malicious activity, malicious software, malicious intentions or communication of malicious content, payload or software or the like. For example, communication can be to transfer malicious software from one entity (source) to another (destination). Alternatively, or additionally, communication can be between one or more malicious entities and other entities, whether malicious or not. Yet further, communication can be targeted to exploit a vulnerability at an entity such as a computer system or the like, whether such entity is directly involved in the present communication or not. Many other such malicious communications can take place via the computer network as part of the communication 200 as will be apparent to those skilled in the art. All such malicious communications, along with other communications that seek to, have the potential to, may result in or otherwise cause unauthorized access, unauthorized use or unauthorized modification of a computing entity or resource shall hereinafter be referred to as a security threat.

Security services 204a to m are provided with access to the communication 200 such as by being installed, configured or deployed at an endpoint (source or destination) of the communication 200 or at an intermediary of the communication 200 such as a switch, router, proxy, hub or the like. Alternatively, security services 204 can be provided as one or more additional entities in communication with the network on which the communication 200 takes place. For example, the security services 204 can include one or more of: an intrusion detection system; a malware detection system; a firewall; a proxy; an antivirus system; and a spyware detection system. Other suitable and/or desirable security services for network communication will be apparent to those skilled in the art. The security services 204 are adapted to generate security events such as may be prompted, occasioned or triggered by the communication 200. Thus the security services 204 monitor, watch, react-to, scan, observe or process data transmission as part of the communication 200 and, in accordance with the design and implementation of each security service 204, generate security events. For example, events of an intrusion detection service operating with transmission control protocol (TCP) communications and user datagram protocol (UDP) communications can include: "SYN Port Scan" (a technique employed by malicious software to determine the state of a communications port without establishing a full connection); "ICMP Flood" (Internet Control Message Protocol is a connectionless protocol used for IP operations, diagnostics, and errors. The sending of an abnormally large number of ICMP packets in an effort to overwhelm a target entity and reduce or deny service); "TCP Invalid Packet Size" 0; "ICMP Sweep" (also known as a "ping sweep" can be used to determine which of a range of IP addresses map to live computing entities); "TCP Port Scan" (a technique employed to identify open ports for TCP connections); "TCP Bad Option Length" (a non-compliant communications message where a specified option length does not match a specified standard for the protocol); and other security events. Security events are data items, data structures, messages, log entries or the like that indicate at least the nature of the identified security event (such as by way of an event identifier) and include network communication characteristics for the communication 200 for which the event is generated, such characteristics including at least characteristics relevant to, pertaining to, or supporting the generation of the event. For example, a security event can include: an event name or identifier; a time; a source network address for the communication 200; a source port (if relevant) for the communication 200; a destination network address for the communication 200; a destination port (if relevant) for the communication 200; and other characteristics as may support or relate to the event in question. Some events further include an identification of a communication protocol employed by the communication 200. Where an identification of the communication protocol is not included such identification can nonetheless be made with reference to the communication 200 itself or other events raised with respect to the communication 200.

Events generated by the security services 204 are combined to a security event set 222. In one embodiment the events are combined based on a rules-based security approach in which rules are defined to identify and record security events meeting certain criteria, such as, inter alia: particular combinations of particular types of event; particular volume of events; particular rate of generation of events; or combinations of or alternatives to such rules. In one embodiment the set of security events is generated as a problem ticket using a product or service such as BT Assure Threat Monitoring as previously described. Alternatively, events can be combined to an event set 222 based on predefined criteria such as, inter alia: a time window in which events occurred; the communication 200 or part of the communication 200 to which the events relate; a set or subset of the security services 204 from which the events arise; and other such suitable criteria as will be apparent to those skilled in the art.

Once generated the security event set 222 is processed by an event set processor 208 with reference to a definition of acceptable network communication characteristics 206 as described below.

The definition of acceptable network communication characteristics (ANCC) 206 includes a representation of network communication characteristics for a plurality of communication protocols that conform to a protocol specification such that communications exhibiting characteristics consistent with the ANCC 206 are considered consistent with the protocol specification. That is, where a protocol specification stipulates one or more particular characteristics for a communication protocol, those characteristics are defined in the ANCC 206. For example, if a protocol specification for a particular protocol stipulates a message header having a size ranging from 16 to 64 bytes, such range of header sizes is codified in the ANCC 206 for the protocol. Similar definitions can be included in the ANCC for conceivably any and all of the network communication characteristics described above, including inter alia: a size, range of sizes, volume, range of volumes, rate and/or range of rates of data in a communication using the protocol; a size or range of sizes of a header of a message in the communication; characteristics of a source and/or destination entities in the communication such as addressing methodologies, port usage and the like; and/or features of the communication protocol such as: a nature of connection setup for a protocol; message structure and/or format, organization and the like; communication close-down processes including a protocol for ceasing, terminating or closing a communication; and other such characteristics and features as will be apparent to those skilled in the art.

A purpose of the ANCC 206 is to identify deviations from acceptable communication characteristics. Thus, in a simple example, where communication 200 includes a message having a header that falls outside a header size range stipulated in ANCC 206 such message and the communication can be determined to deviate from the ANCC 206. Such deviation will initially be flagged by way of a security event in the security event set 222 based on an identification by a security service 204. Such event includes network communication characteristics as previously described and this can include a header size for the communication 200. Such characteristics are compared with the ANCC 206 to identify deviation from the ANCC 206. Furthermore, in some embodiments, an extent of deviation is also determined. An extent of deviation is a degree, magnitude, amount, scope, intensity or other measure of deviation to quantify how deviant the communication 200 is with respect to the ANCC 206. Such extent can be, for example, a measure of a difference in size between a message header in the communication 200 compared to acceptable message headers according to the ANCC 206. Other measures of extent of deviation will be apparent to those skilled in the art.

The event set processor 208 is a hardware, software, firmware or combination component adapted to receive the ANCC 206 and process the security event set 222 to generate a set of deviation records 216. Each record in the set of deviation records 216 corresponds to a deviation of the communication 200 with respect to the ANCC 206 and, in some embodiments, an extent of such deviation. Thus the event set processor 208 includes a communications protocol identifier 210 for identifying a protocol for the communication 200 for which the events in the event set 222 are generated. This identification can be made with reference to one or more of the events in the event set 222 such as events explicitly referencing, indicating or identifying the protocol. The event set processor 208 further includes a deviation detector 212 and deviation recorder 214 for processing each event in turn. For each event the deviation detector 212 initially compares the network communication characteristics associated with the event with the ANCC 206 to detect a deviation. Where a deviation is detected, the deviation recorder 214 records the deviation to the deviation records 216 store. Each deviation record in the store 216 identifies the communication characteristic for which the deviation is detected. Notably, the protocol identification by identifier 208 can take place for each event in the event set 222. Alternatively, a single identification can be undertaken for all events in the set 222.

Thus the deviation records 216 identify deviations of the communication from the ANCC 206 based on security events generated by the security services 204. The deviation records 216 constitute a suitable basis for characterizing classes or categories of computer security threat since the nature and, in some embodiments, extent of deviation across network communication characteristics serve to suitably characterize a class of threat. Accordingly, types of threats can be classified and identified based on the deviation records 216. A threat identifier 218 is a hardware, software, firmware or combination component for accessing the deviation records 216 to identify a computer security threat based thereon. The threat identifier 218 can be informed of a set of one or more deviations from the ANCC 206 indicating, characterizing or otherwise identifying a computer security threat. Where such set of deviations is identified in the deviation records 218 the threat identifier 218 identifies the communication as a computer security threat.

In one embodiment a particular configuration of deviations from the ANCC 206 can be predetermined and/or predefined as one or more security threat definitions 220. Security threat definitions 220 include a definition for each of one or more computer security threats for each of one or more communication protocols. Each computer security threat is defined by a set of deviations from the ANCC 206 for a protocol. For example, security threat definitions 220 can be defined based on known security threats engaged in, involved in, or implicated in network communication for which deviations from the ANCC 206 are measured and recorded. Such deviations can be measured in a control environment for communication known to involve the security threat, or alternatively, learned or recalled from previously observer security threats. Thus, in use, the threat identifier 218 compares the deviation records 216 for a communication with security threat definitions 220 to identify a security threat. In some embodiments the identification of a subset of deviations defined for a security threat in the security threat definitions 220 is sufficient to warrant identification of a security threat, where the proportion or number of deviations for a threat that are identified in deviation records meets some predetermined threshold, or alternatively where some quorum of deviations for a security threat definition is identified.

FIG. 3 is a flowchart of a method to identify a computer security threat in accordance with an embodiment of the present disclosure. Initially at 302 the event set processor 208 receives the ANCC 206. At 304 the event set processor 208 receives the security event set 222. At 306 a loop is initiated through each event in the security event set. At 308 a communication protocol for a current event is identified by the communication protocol identifier 208. At 310 the deviation detector 212 detects deviations of network communication characteristics of the current event from the ANCC 206 for the identified protocol. At 312 the deviation recorder 214 generates a record to the deviations records 216 for each deviation. The loop continues at 314 until all events are processed. Subsequently, at 316, the threat identifier 218 identifies one or more threats based on the deviation records 216 as hereinbefore described, such as by reference to the security threat definitions 220.

One particularly advantageous application of embodiments of the present disclosure is in the identification of sets of security events that relate to common computer security threats. Typically, security analysts are required to analyze multiple prospective threats based on multiple sets of events where the sets actually relate to the same threat. Embodiments of the present disclosure can be configured to mitigate this challenge as described below.

Figure 4:
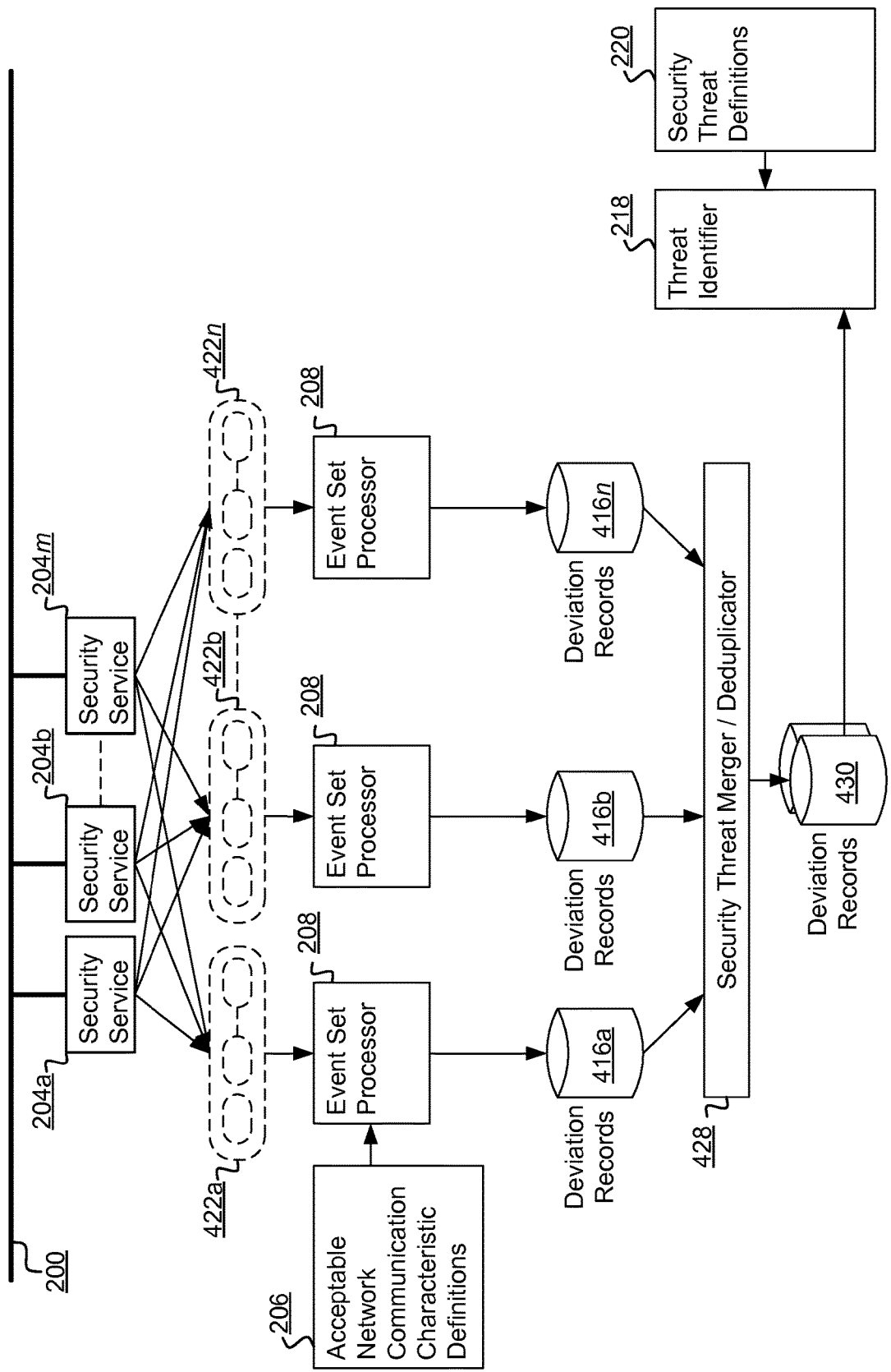
FIG. 4 is a component diagram of a system to identify a computer security threat based on communication via a computer network in accordance with an alternative embodiment of the present disclosure

FIG. 4 is a component diagram of a system to identify a computer security threat based on communication via a computer network in accordance with an alternative embodiment of the present disclosure. The arrangement of FIG. 4 shares many features in common with FIG. 2 and these will not be repeated here. FIG. 4 illustrates a plurality of security event sets 422a to n each being processed by the event set processor 208 to generate a set of deviation records 416a to n. An initial set of deviation records 416a is alone suitable for identifying subsequent security threats by comparison of a subsequent set of deviation records (such as records 416b) for commonality with initial set of records 416a. Thus it can be seen that the security threat definitions 220 can be defined this way based on deviation records 416a for, for example, known or suspected threats.

Additionally, whether deviation records 416a are known to relate to a computer security threat or not, any subsequent set of deviation records such as records 416b or n can be compared with records 416a to identify commonality or identity to avoid duplicate comparisons by threat identifier 218. Thus the deviation records 416a to n are processed by a security threat merger/deduplicator 428 (hereinafter the "merger component"). The merger component 428 is a hardware, software, firmware or combination component adapted to identify commonality between multiple set of deviation records 416a and to provide a deduplicated set of deviation records 430 such that redundant sets of deviation records are avoided. This can be achieved by comparing deviation records such as records 416a and 416b and identifying identity. Where identity is identified, one of the sets of deviation records can be discarded. Where there is not complete identity, multiple options arise:

where one set of deviation records is a subset of the other, the superset is preferably retained; or where two sets of deviation records share a common subset, the common subset is used to constitute a new set of deviation records and the two original sets can be retained separately or a hierarchy of deviation records can be formed in which the two original sets depend or inherit from the new set of deviation records with the common deviation records excluded.

Thus embodiments of the present disclosure further provide for consolidation of deviation records 416 and, therefore, consolidation of event sets 422 to aid threat identification either by human analyst of the threat identifier 218.

FIG. 5 is a flowchart of a method to identify a computer security threat in accordance with an alternative embodiment of the present disclosure. Many of the tasks of FIG. 5 are identical to those described above with respect to FIG. 3 and these will not be repeated here. At 526 of FIG. 5 the method stores a set of records of deviation 416a as a security threat identifier for identifying subsequent security threats by comparing with the set of records. For example, the set of records of deviation 416a can be stored to the security threat definitions 220.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to identify a computer security threat based on communication via a computer network, the method comprising:
    receiving a definition of acceptable network communication characteristics for each of a plurality of communication protocols;
    receiving a set of security events for the communication, each security event including network communication characteristics for the communication;
    for each security event in the set of security events:
        identifying a communication protocol associated with the security event,
        detecting deviations of the network communication characteristics of the security event from the acceptable network communication characteristics for the identified communication protocol, wherein the detecting includes determining an extent of deviation as a measure of difference between the deviated communication characteristic and the acceptable network communication characteristic,
        generating a record of each deviation, the record identifying a deviated communication characteristic for which the deviation is detected,
        identify a commonality between a set of generated deviation records and another set of generated deviation records, and
        deduplicate the commonality between the set of generated deviation records and the another set of generated deviation records; and
    identifying a computer security threat for the communication based on the records generated of each deviation for the set of security events.

2. The method of claim 1, further comprising:
    receiving a definition of one or more computer security threats, each computer security threat being defined, for each of one or more communication protocols, by a set of deviations from the acceptable network communication characteristic for the communication protocol,
    wherein identifying a computer security threat for the communication includes comparing the records generated for the set of security events to the received definition of one or more computer security threats.

3. The method of claim 1, wherein the definition of acceptable network communication characteristics for each of the plurality of communication protocols is based on a specification of the communication protocol.

4. The method of claim 2, wherein the one or more computer security threats are further defined by an extent or range of extents of the deviation from the acceptable network communication characteristics for the communication protocol.

5. The method of claim 1, wherein the one or more of the records of each deviation further identifies an extent of the deviation between the network communication characteristics of the security event from the acceptable network communication characteristics for the identified communication protocol.

6. The method of claim 1, wherein the network communication characteristics include one or more of:
    a size, a range of sizes, a volume, a range of volumes, a rate or a range or rates of data in the communication;
    a size or a range of sizes of a header of a message in the communication;
    characteristics of a source entity to the communication;
    characteristics of a destination entity to the communication; or
    features of the communication protocol.

7. The method of claim 6, wherein the features of the communication protocol include one or more of:
    an order of messages or types of message according to one or more protocol definitions; or
    a message structure or format.

8. The method of claim 6, wherein the characteristics of the source entity include one or more of:
    a particular port of the source entity;
    a set of ports of the source entity; or
    a number of ports of the source entity.

9. The method of claim 6, wherein the characteristics of the destination entity include one or more of:
    a particular port of the destination entity;
    a set of ports of the destination entity; or
    a number of ports of the destination entity.

10. The method of claim 1, wherein the security events are received from one or more computer security services.

11. The method of claim 10, wherein the one or more of the computer security services include:
an intrusion detection system;
a malware detection system;
a firewall; a proxy;
an antivirus system; or
a spyware detection system.

12. A computer system comprising:
a processor and memory storing computer program code for identifying a computer security threat based on communication via a computer network, the processor and memory configured to:
receive a definition of acceptable network communication characteristics for each of a plurality of communication protocols;
receive a set of security events for the communication, each security event including network communication characteristics for the communication;
for each security event in the set of security events:
identify a communication protocol associated with the security event,
detect deviations of the network communication characteristics of the security event from the acceptable network communication characteristics for the identified communication protocol, wherein the detecting includes determining an extent of deviation as a measure of difference between the deviated communication characteristic and the acceptable network communication characteristic,
generate a record of each deviation, the record identifying a deviated communication characteristic for which the deviation is detected,
identify a commonality between the set of generated deviation records and another set of generated deviation records, and
deduplicate the commonality between the set of generated deviation records and the another set of generated deviation records; and
identify a computer security threat for the communication based on the records generated of each deviation for the set of security events.

13. A non-transitory computer-readable storage medium storing a computer program element comprising computer program code to, when loaded into a computer system and executed thereon, cause the computer system to perform the method as claimed in claim 1.

* * * * *